Figure 1:
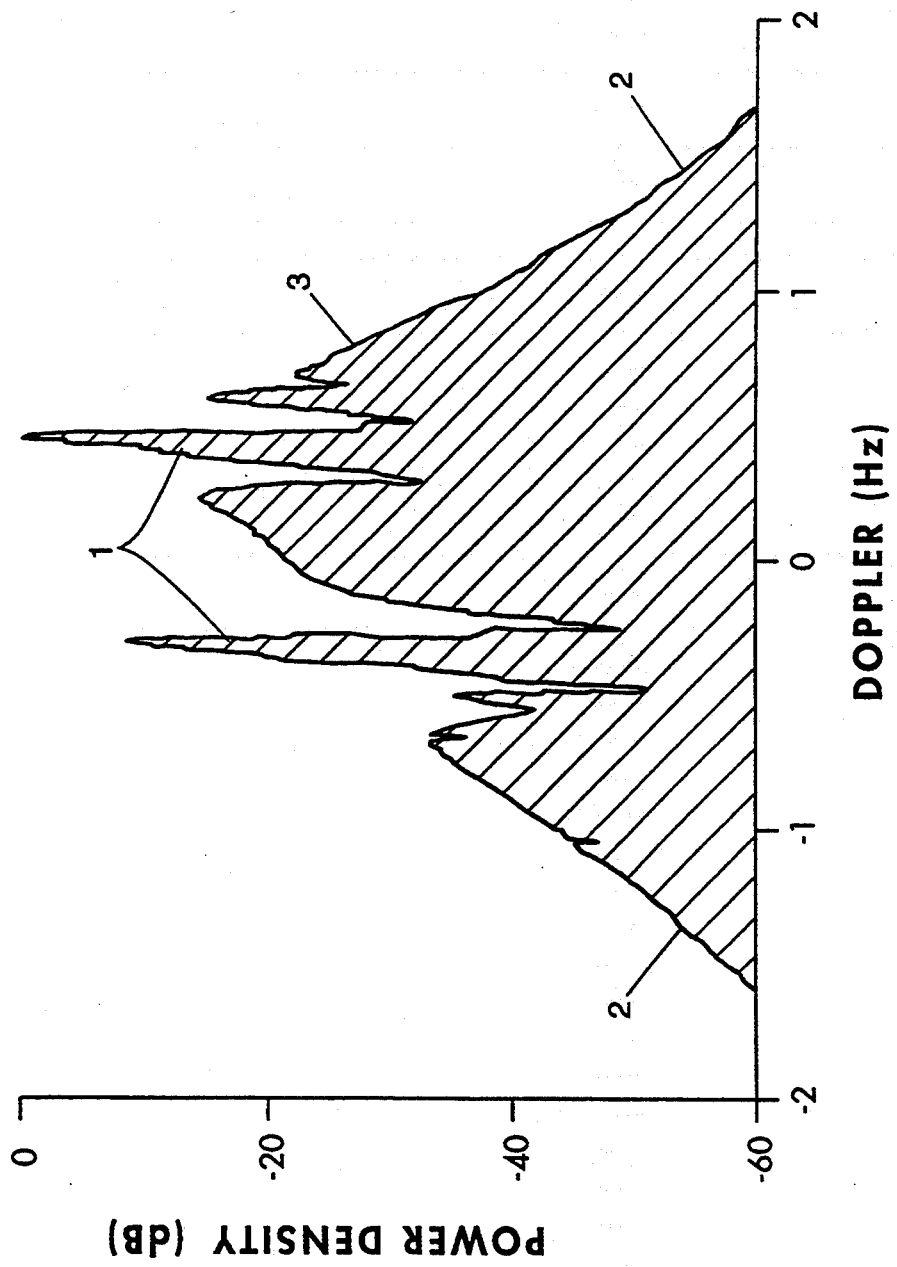

United States Patent [19]
Anderson

[11] Patent Number: 5,438,334
[45] Date of Patent: Aug. 1, 1995

[54] RAINFALL DETECTION

[75] Inventor: Stuart J. Anderson, Adelaide, Australia

[73] Assignee: The Commonwealth of Australia, Canberra, Australia

[21] Appl. No.: 175,344

[22] PCT Filed: Jul. 17, 1992

[86] PCT No.: PCT/AU92/00357
§ 371 Date: Jan. 5, 1994
§ 102(e) Date: Jan. 5, 1994

[87] PCT Pub. No.: WO93/02370
PCT Pub. Date: Feb. 4, 1993

[30] Foreign Application Priority Data
Jul. 18, 1991 [AT] Austria .................. PK 7275

[51] Int. Cl.⁶ .................................. G01S 13/95
[52] U.S. Cl. .................................. 342/26
[58] Field of Search ........................ 342/26

[56] References Cited
U.S. PATENT DOCUMENTS

| | | | |
|---|---|---|---|
| 4,633,255 | 12/1986 | Trizna | 342/26 X |
| 4,728,952 | 3/1988 | Residois | 342/26 |
| 4,933,678 | 6/1990 | Tennyson | 342/26 X |
| 5,177,487 | 1/1993 | Taylor, Jr. et al. | 342/26 X |
| 5,264,852 | 11/1993 | Marquet | 342/26 |

FOREIGN PATENT DOCUMENTS

WO9221041  11/1992  WIPO .......... G01S 13/95

OTHER PUBLICATIONS

Ligthart et al., "An X-band solid-state FM-CW weather radar", *IEE Proceedings*, Dec. 1990, pp. 418-426.

Anderson S. J., Radar International Confernece, Oct. 19-21, 1987, pp. 609-612.

Russchenberge et al., "Combined Doppler and Polarimetric Radar Measurements of Precipitation", *Remote Sensing Science for the Nineties*, May 20-24, 1990, 10th Annual International Geoscience & Remote Sensing Symposium, pp. 1037-1040.

LeMehaute et al., "Dynamic Interaction of Intense Rain with Water Waves", *Journal of Physical Oceanography*, Dec. 1990, pp. 1815-1812.

Nystuen, Jeffrey A., "A Note on the Attenuation of Surface Gravity Waves by Rainfall", *Journal of Geophysical Research, Oct. 15, 1990, pp. 18.353-18.355.*

Manton, M. J. "On the Attenuation of Sea Waves by Rain", *Geophysical Field Dynamics*, 1973, pp. 249-260.

Reynodls, Osborne, *Papers on Mechanical and Physical Subjects, Waves*, Cambridge: at the University Press, 1990, vol. 1, 15, pp. 86-88.

Primary Examiner—Mark Hellner
Attorney, Agent, or Firm—Cushman, Darby & Cushman

[57] ABSTRACT

A method of obtaining oceanographic and meteorological data from high frequency radar spectral information comprising the steps of transmitting a plurality of signals to a remote location, recording signals backscattered from the said location, generating a family of Doppler cluter spectra from the recorded backscattered signals and analysing the Doppler clutter spectra in terms of a model or models to detect the presence of rainfall. The model or models identify the presence of rainfall by detecting a reduced amplitude in some parts of the Doppler spectrum, especially in the "wings" of the spectrum by which is meant the regions where the magnitude of the Doppler shift is greatest. The method may also be used by detecting opportunity signals scattered from a remote location.

13 Claims, 1 Drawing Sheet

RAINFALL DETECTION

BACKGROUND OF THE INVENTION

This invention relates to a method of remotely detecting the presence of rain by obtaining information from high frequency radio waves scattered from the sea surface. Such waves may have been generated by a sky-wave radar facility or they may be transmissions of opportunity radiated by HF broadcasters or other sources, man-made or natural.

Rainfall over the ocean has hitherto only been measured by ships at sea and, recently, by satellite-borne sensors. The former method is only able to collect data regularly on commercial shipping routes and irregularly at other parts of the globe, while the satellite techniques, which are still highly experimental, are limited to the narrow swathe below the satellite orbit.

By observing rainfall over the oceans a better understanding of the dynamics of the atmospheric moisture cycle may result. The consequences of this better understanding would include improved rainfall predictions over land, and a more complete meterological model with which to base predictions of global climate change.

In co-pending application number PCT/AU92/00225, entitled Oceanographic and Meterological Data, a method was disclosed of determining a with range of oceanographic and meteorological factors. In particular it was disclosed how an Over-the-Horizon Radar (OTHR) could be used to determine such factors as wind direction, wind speed regime, sea state, dominant wave period, significant wave height, dominant wave direction, nondirectional wave spectrum, directional wave spectrum and extended directional wave spectrum.

An OTHR is particularly useful in this regard due to its wide area of coverage, ability to record and analyse measurements in real time and high spatial and temporal resolution. The only competing technology is that of satellite-born sensors, but these cannot achieve real-time measurements.

It is a discovery of the inventor that an OTHR can be used to remotely detect rainfall. This is particularly useful since there currently exists no operational method of remotely detecting the presence of rainfall. Although the presence of rain-bearing clouds can be determined using satellite-borne sensors, and indirect techniques for inferring likely rainfall from cloud temperatures have been developed, the actual occurrence of precipitation can not be established with existing technology.

The actual discovery is that the presence of rainfall in an area interrogated by an OTHR is evident in the nature of the sea clutter Doppler spectrum. The invention discloses a method of extracting this information from the spectrum. In order to comprehend the invention, it is first necessary to understand the scattering of radio waves from the sea surface and the signal processing employed to obtain HF Doppler spectra from the radar echoes. This is achieved in the co-pending application referenced above.

A typical sea clutter spectrum shows a spread of signals ranging between minus 1 or 2 Hertz and plus 1 or 2 Hertz. It has long been known that one of the effects of rain on the sea surface is the damping of wind-generated surface gravity waves. This invention is based on the concept that this wave damping necessarily results in changes to the Doppler spectrum of the reflected radio waves. In particular, significant changes to the "wings" of the Doppler spectrum arise due to the attenuation of the shorter gravity waves by the rain.

Several mechanisms have been proposed to account for the observational evidence that rainfall attenuates surface gravity waves. Manton, M. J. "On the attenuation of sea waves by rain", Geophysical Fluid Dynamics, vol. 5, pp. 249–260, 1973 identified three possibilities:

The entrainment of fluid by drops descending through the water produces vertical mixing, as originally suggested by Reynolds, O., Papers on Mechanical and Physical Subjects, vol. 1, p. 86, Cambridge University Press, 1900. This entrainment will generate sub-surface vortex rings which propagate downward, producing a thin turbulent mixing layer which will interact with the surface gravity wave velocity field and cause attenuation. The microscate processes can be parameterised as an eddy viscosity.

The momentum flux into the water body produces a resultant vertical stress on the water, and a horizontal stress if the mean wind velocity is non-zero. The vertical stress gradient must be balanced by a vertical pressure gradient, which is equivalent to an increase in the gravitational acceleration below the water surface. The surface wave dynamics, as governed by the boundary conditions and embodied in the dispersion relation, are modified accordingly.

If the mean wind velocity is non-zero, the horizontal momentum flux must be reflected in the fluid momentum transport by surface currents and surface gravity waves.

Manton proceeded to argue that only the first of these mechanisms could contribute appreciably in practice. Le Mehaute, B. L. and Khangaonkar, T. "Dynamic interaction of intense rain with water waves", J. Phys. Ocean, vol. 20, pp. 1805–1812, 1990 carded out a detailed analysis of the transfer of horizontal momentum and showed that the wave surface dynamics enhanced momentum transfer, so that wave amplification becomes possible, not just attenuation. Finally, Nysten, J. A. "A note on the attenuation of surface gravity waves by rainfall", J. Geophys. Res., vol. 93, No. C10, pp. 18353–18355, 1990 used energy arguments to compute e-folding times for attenuation.

It is an object of this invention to provide a method whereby this discovery can be practically exploited to provide a method of remotely detecting the presence of rainfall.

SUMMARY OF THE INVENTION

Therefore, according to one form of this invention, there is proposed a method of obtaining oceanographic and meteorological data from high frequency radar spectral information including the steps of transmitting a plurality of signals to a remote location, recording signals backscattered from the said location, generating a family of Doppler clutter spectra from the recorded backscattered signals and analysing the Doppler clutter spectra in terms of a model or models to detect the presence of rainfall.

In preference the model or models identify the presence of rainfall by detecting a reduced amplitude over some parts of the Doppler spectrum, especially the wings, by which is meant those parts of the spectrum where the magnitude of the Doppler shift is greatest.

In preference the recorded signals are corrected for contamination by radio frequency interference and other forms of degradation.

In preference the detection of rainfall is fully automatic, requiring no human intervention. Nevertheless, interactive Doppler spectrum modelling is preferably available.

In preference maps of rainfall are produced and displayed in real time. The maps are displayed at colour display terminals at which the operator can display a range of other features.

In another form of the invention there is proposed a method of remotely detecting the presence of rainfall from high frequency radar spectral information including the steps of: recording opportunity signals scattered from a remote location; generating a family of Doppler clutter spectra from the recorded scattered signals; and analysing the Doppler clutter spectra in terms of a model or models to detect the presence of rainfall.

In a yet further form of the invention there is proposed an apparatus for remotely detecting the presence of rainfall comprising:

recording means adapted to records signals backscattered from a remote location;

processing means adapted to generate a family of Doppler clutter spectra from the recorded backscattered signals; and analysis means adapted to analyse the Doppler clutter spectra in terms of a model or models to identify the presence of rainfall in the remote location.

For a better understanding of this invention a preferred embodiment will now be described with reference to the attached drawing in which:

FIG. 1 shows a sea clutter Doppler spectra.

In FIG. 1 there is shown a typical sea clutter Doppler spectrum for one choice of sea state and rain rate. The spectrum extends from about −1.5 Hz to 1.5 Hz. The two sharp peaks 1 centered about 0 Hz are typical of a sea spectrum and characterize the velocity of the waves in the region. The wings 2 of the spectrum are normally present in the absence of rain however in the presence of rain these are suppressed leaving only the central region 3. The difference between the spectrum with and without rain is easily detectable using simple modelling techniques.

The inventor has found that the detectability of rain effects increases quite strongly with radar frequency. Thus the effects of rain are detectable under conditions where high frequencies can be employed and ionospheric corruption of the radar signals is insignificant. Such conditions are characteristic of sporadic E mode propagation.

It can be seen that this invention provides a method whereby the presence of rainfall in a region can be remotely detected. A person skilled in the art will appreciate that there are a number of ways in which the desired information could be extracted from sea clutter Doppler spectra however these would fall within the spirit of the invention.

I claim:

1. A method of remotely detecting the presence of rainfall at a remote location from high frequency radar spectral information including the steps of:

transmitting a plurality of signals to the remote location;

recording signals scattered from the remote location;

generating a family of Doppler clutter spectra from the recorded scattered signals; and analyzing the Doppler clutter spectra in terms of at least one model to detect the presence of rainfall at the remote location.

2. A method of remotely detecting the presence of rainfall at a location from high frequency radar spectral information including the steps of:

recording opportunity signals backscattered from the location;

generating a family of Doppler clutter spectra from the recorded backscattered signals; and analyzing the Doppler clutter spectra in terms of at least one model to detect the presence of rainfall at the remote location.

3. The method of claim 1 in which the at least one model identifies the presence of rainfall by detecting a reduced amplitude in specific parts of the Doppler spectrum.

4. The method of claim 3 wherein the reduced amplitude is in the wings of the Doppler spectrum.

5. The method of claim 1 further including correcting the recorded signals for contamination by radio frequency interference and other forms of degradation.

6. The method of claim 1 further including the step of interactive Doppler spectrum modelling.

7. The method of claim 1 further including the steps of producing maps of detected rainfall and displaying the maps in real time.

8. The method of claim 7 wherein the maps are displayed on display terminals, said display terminals being adapted to display a range of other features including geographic maps, difference maps and rainfall detectability index.

9. The method of claim 8 in which the display terminals are color display terminals.

10. The method of claim 1 in which the detection of rainfall is fully automatic, requiring no human intervention.

11. An apparatus for remotely detecting the presence of rainfall at a location comprising:

recording means for recording signals backscattered from the location;

processing means for generating a family of Doppler clutter spectra from the recorded backscattered signals; and analysis means for analyzing the Doppler clutter spectra in terms of at least one model to identify the presence of rainfall in the location.

12. The apparatus of claim 11 wherein the at least one model detects a reduced amplitude in specific parts of the Doppler spectrum.

13. The apparatus of claim 12 in which the reduced amplitude is in the wings of the Doppler spectrum.

* * * * *